(12) United States Patent
Rainisto

(10) Patent No.: US 8,185,841 B2
(45) Date of Patent: May 22, 2012

(54) ELECTRONIC TEXT INPUT INVOLVING A VIRTUAL KEYBOARD AND WORD COMPLETION FUNCTIONALITY ON A TOUCH-SENSITIVE DISPLAY SCREEN

(75) Inventor: Roope Rainisto, Helsinki (FI)

(73) Assignee: Nokia Corporation, Espoo (FI)

( * ) Notice: Subject to any disclaimer, the term of this patent is extended or adjusted under 35 U.S.C. 154(b) by 1833 days.

(21) Appl. No.: 11/135,623

(22) Filed: May 23, 2005

(65) Prior Publication Data

US 2006/0265668 A1  Nov. 23, 2006

(51) Int. Cl.
*G06F 3/048* (2006.01)
*G06F 3/01* (2006.01)

(52) U.S. Cl. .......... 715/773; 715/716; 715/843; 725/37; 710/30; 348/552

(58) Field of Classification Search ................ 715/716, 715/843, 773; 725/37; 710/30; 348/552
See application file for complete search history.

(56) References Cited

U.S. PATENT DOCUMENTS

| | | | |
|---|---|---|---|
| 4,969,097 A * | 11/1990 | Levin ............................. | 715/534 |
| 5,220,625 A | 6/1993 | Hatakeyama et al. | |
| 5,724,457 A * | 3/1998 | Fukushima ................... | 382/311 |
| 5,805,159 A * | 9/1998 | Bertram et al. ............... | 715/764 |
| 5,864,340 A * | 1/1999 | Bertram et al. ............... | 715/780 |
| 5,953,541 A | 9/1999 | King et al. .................... | 395/887 |
| 5,959,629 A * | 9/1999 | Masui ............................ | 715/808 |
| 6,002,390 A * | 12/1999 | Masui ............................ | 345/173 |
| 6,321,158 B1 | 11/2001 | DeLorme et al. | |
| 6,337,698 B1 | 1/2002 | Keely et al. | |
| 7,171,353 B2 * | 1/2007 | Trower et al. ................. | 704/9 |
| 7,194,404 B1 * | 3/2007 | Babst et al. .................... | 704/9 |
| 2002/0015042 A1 | 2/2002 | Robotham et al. | |
| 2002/0024506 A1 | 2/2002 | Flack et al. | |
| 2002/0052900 A1 * | 5/2002 | Freeman ........................ | 707/531 |
| 2002/0156864 A1 | 10/2002 | Kniest | |
| 2004/0239681 A1 | 12/2004 | Robotham et al. | |

(Continued)

FOREIGN PATENT DOCUMENTS

| | | |
|---|---|---|
| WO | 02/33527 | 4/2002 |
| WO | 02/19143 | 5/2002 |
| WO | 2004/079557 | 9/2004 |

OTHER PUBLICATIONS

Pocket PC OS, Microsoft Corporation, Public product.

(Continued)

*Primary Examiner* — Nicholas Augustine
(74) *Attorney, Agent, or Firm* — Alston & Bird LLP

(57) ABSTRACT

A text input method for an electronic apparatus having a user interface with a touch-sensitive display screen, where a virtual keyboard is presentable on the display screen to facilitate text input for a user by pointing at different virtual keys of the virtual keyboard and where completion functionality is provided for predicting full word candidates for partial word inputs made by the user on the virtual keyboard, the method including receiving a partial word input from the user and deriving a set of full word candidates using the word completion functionality, each of the full word candidates in the set having a prefix and a suffix, where the prefix corresponds to the partial word input. The suffixes for at least a sub set of the full word candidates are presented in a predetermined area on the display screen, where each of the presented suffixes is made selectable for the user.

3 Claims, 7 Drawing Sheets

U.S. PATENT DOCUMENTS

| | | |
|---|---|---|
| 2005/0012723 A1 | 1/2005 | Pallakoff |
| 2005/0195221 A1 | 9/2005 | Berger et al. |
| 2005/0223308 A1* | 10/2005 | Gunn et al. ............... 715/500 |
| 2005/0283364 A1* | 12/2005 | Longe et al. ............... 704/257 |
| 2006/0020904 A1 | 1/2006 | Aaltonen et al. |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0074885 A1 | 4/2006 | Chiu et al. |
| 2006/0095842 A1* | 5/2006 | Lehto ............... 715/532 |
| 2006/0101005 A1 | 5/2006 | Yang et al. |
| 2006/0161870 A1 | 7/2006 | Hotelling et al. |
| 2006/0161871 A1 | 7/2006 | Hotelling et al. |
| 2006/0274051 A1* | 12/2006 | Longe et al. ............... 345/173 |
| 2007/0263007 A1 | 11/2007 | Robotham et al. |

OTHER PUBLICATIONS

Ezi Tap, Zi Corporation, Public product.
"eZiText® Chinese", zi corporation, www.zicorp.com/ezitextchinesehome.htm, pp. 1-3.
International Search Report dated Oct. 12, 2010.
European Office Action dated Aug. 4, 2010.

* cited by examiner

ELECTRONIC TEXT INPUT INVOLVING A VIRTUAL KEYBOARD AND WORD COMPLETION FUNCTIONALITY ON A TOUCH-SENSITIVE DISPLAY SCREEN

FIELD OF THE INVENTION

The present invention generally relates to electronic equipment capable of text input, and more particularly to a text input method for an electronic apparatus having a user interface with a touch-sensitive display screen, wherein a virtual keyboard is presentable on the display screen so as to facilitate text input for a user by pointing at different virtual keys of the virtual keyboard, and wherein word completion functionality is provided for predicting full word candidates for partial word inputs made by the user on the virtual keyboard. The invention is also related to an electronic apparatus of this kind, and to an associated computer program product.

BACKGROUND OF THE INVENTION

Apparatuses with touch-sensitive display screens often provide a virtual keyboard feature in the user interface to facilitate text input. This works by displaying a virtual keyboard, often resembling a real-life keyboard, on the display screen. By tapping with a writing tool on individual buttons or keys of the virtual keyboard, the user may input successive characters which aggregate to a text input shown in a text input field on the display screen.

Since text input with a writing tool on a touch-sensitive display screen by nature will be slower than manual input on a hardware (physical) keyboard, it is generally desired to improve the input speed. One of the most popular approaches in this regard is the provision of word completion functionality in the user interface for automatic presentation of full word candidates to what the user has currently inputted in the form of a partial word.

For instance, if the user writes "wo" by tapping on the "w" key and then the "o" key of the virtual keyboard, the word completion functionality can predict full word candidates such as "word", "world" and "wormhole" and present them on the display screen in a selectable manner. A desired one of these candidates may be selected by the user by tapping on it, and the full word thus selected will automatically replace the current partial word input on the display screen. In the example above, the eight-character word "wormhole" may be input by a total of only three taps with the writing tool (two for inputting "w" and "o", and one for selecting the "wormhole" candidate"), therefore saving precious taps and improving on the text input speed.

While word completion functionality certainly has its benefits, some problems are associated therewith. In more particular, since the apparatus involved will typically be a small portable device such as a mobile terminal or a pocket computer, the available display screen space will be a limited resource. Thus, displaying multiple full word candidates anywhere in the user interface may potentially block other relevant information to be displayed (such as actual application contents), whereas if a dedicated area is reserved for the word completion functionality, less area will be available for presentation of other information.

A first prior art approach is illustrated in FIG. 9. A current text input 104 has been made by tapping with a writing tool on a virtual keyboard 110 and is shown in a text input field 102 of a touch-sensitive display screen. The current text input 104 consists of three complete words ("The Oxford English") and a current partial word 106 ("Dic"). The cursor position is indicated at 107. In FIG. 9, the word completion functionality has derived a set of predicted full word candidates 109. The candidates all have the partial input 106 as prefix. The full word candidates 109 are presented in a vertical list in a pop-up window 108 which may have a dynamic size and/or location.

A second prior art approach is illustrated in FIG. 10. Here, a set of predicted full word candidates 109', as derived by the word completion functionality, is shown horizontally candidate by candidate in a dedicated area 108' between the virtual keyboard 110 and the text input field 102.

SUMMARY OF THE INVENTION

In view of the above, an objective of the invention is to solve or at least reduce the problems discussed above. More specifically, the invention aims at providing word completion functionality in a manner which reduces or even eliminates the risk of blocking or otherwise interfering with other information on the display screen, such as application contents, and also saves display screen space. Another objective is to perform presentation of word completion candidates at a consistent display screen location which is intuitive to the user and facilitates efficient text input.

Generally, the above objectives and purposes are achieved by a text input method, an electronic apparatus and a computer program product according to the attached independent patent claims.

A first aspect of the invention is a text input method for an electronic apparatus having a user interface with a touch-sensitive display screen, wherein a virtual keyboard is presentable on said display screen so as to facilitate text input for a user by pointing at different virtual keys of said virtual keyboard, and wherein word completion functionality is provided for predicting full word candidates for partial word inputs made by said user on said virtual keyboard, the method involving:

receiving a partial word input from said user;

deriving a set of full word candidates using said word completion functionality, each of the full word candidates in said set having a prefix and a suffix, wherein the prefix corresponds to said partial word input; and presenting the suffices for at least a sub set of the full word candidates in a predetermined area on said display screen, wherein each of the presented suffices is made selectable for said user.

Advantageously, also the prefix that corresponds to said partial word input is presented in said predetermined area.

By presenting only the suffices for the candidates, and not the entire full words that they represent, considerable display screen space may be saved. In turn, saving display screen space means a reduced risk of blocking or otherwise interfering with other information on the display screen. For instance, if the partial word is "compl", displaying "ete", "etion" and "ex" versus "complete", "completion" and "complex" takes a lot less space. Mentally repeating "compl" several times is unnecessary. In the mental process of writing a word the user has the whole word in his or her mind, and therefore selecting just a suffix like "etion" is not difficult in practice.

In one embodiment, the suffices for all of the full word candidates in the derived set are presented in the predetermined area—i.e., the word completion functionality will derive the exact number of full word candidates, the suffices of which are to be presented and made selectable. In another embodiment, though, the word completion functionality may derive more full word candidates than can be presented at the same time in the predetermined area. In such a case, some principle of selection may be applied as regards which of these suffices that are to be presented, as will be explained in more detail in the following.

A typical number of suffices presented in the predetermined area may range from 2 to 4, but other values are also possible.

In a particularly advantageous embodiment, the predetermined area is located within or at said virtual keyboard on said display screen. Advantageously, the prefix is shown first, followed by each presented suffix in successive order horizontally from left to right on said display screen.

Even more advantageously, the predetermined area is located within, or on top of, a space bar included in the virtual keyboard. This is in fact a very logical and consistent positioning of word completion candidates on the display screen. A word is completed by tapping the space bar, so displaying word completion candidates in the same area as the space bar allows a more consistent mechanic movement pattern for the hand of the user. In turn, this will improve on the user's text input speed.

Advantageously, the space bar, and therefore the predetermined area, is located at one edge of the display screen. Positioning the candidates in this way at the edge of the display screen makes efficient use of Fitt's law, which states that tapping (selecting) items at a display screen edge is much easier and more effective than elsewhere on the display screen.

The text input method may involve the steps of detecting selection by said user of one of the presented suffices; and for the selected suffix, replacing a presentation of said partial word on said display screen with a presentation of the full word candidate to which the suffix belongs.

Advantageously, after said step of replacing a presentation, the presented suffices are removed from presentation in the predetermined area. Moreover, the presented suffices may be removed from presentation in the predetermined area upon detecting selection by said user of said space bar, the user thereby indicating that the current text input is a complete word.

In other words, word completion candidates will only be shown in the predetermined area during such times when it is relevant to do so, and during other times the space bar may be used solely for inputting space characters. If the current partial word which has been input by the user contains less than a certain number of characters, such as two, no suffices will be shown in the predetermined area. Thus, in this embodiment, single-character candidates are not displayed; a candidate needs to have at least two characters in order to be displayed to the user. This conforms well to the general purpose of a virtual keypad with word completion functionality, namely to reduce the amount of key taps—tapping single character candidates obviously does not fulfill that purpose.

In one embodiment, aforesaid step of detecting selection by said user involves differentiating between a first type of selection and a second type of selection, wherein said step of replacing a presentation involves adding a space character after said full word candidate if the detected selection is of the first type. The first type of selection may involve tapping with a writing tool within an activation area representing the selected suffix, wherein the second type of selection may involve pointing with the writing tool within the activation area and dragging the writing tool outside of the activation area before lifting it, or vice versa. This provides a convenient way for the user to decide whether a trailing space character is to be added automatically or not.

In this document, a "writing tool" is an object suitable for interaction with a touch-sensitive display so as to input text in the manner described. Thus, a "writing tool" may be a stylus, pen, a user's finger or any other physical object suitable for such interaction with the touch-sensitive display.

Preferably, the predetermined area only overlaps a predefined maximum part of the space bar, the maximum part being such that a sufficient area of the space bar is left available for convenient selection by said user. The extent of the sufficient area that is deemed enough for convenient selection of the space bar, even when the predetermined area is used to the maximum for presentation of suffices, will of course have to be decided for each actual implementation. However, at least an area corresponding to a certain number of characters, such as 2, of typical size is presently believed to be appropriate to leave unoccupied for convenient selection of the space bar.

The text input method may involve the step of selecting, among the set of full word candidates derived by the word completion functionality, candidates to be included in said sub set for presentation in a way such that shorter suffices are favored over longer suffices, thereby allowing a larger number of suffices to be presented in the predetermined area. For instance, suffices containing only two or three characters may be favored over ones that contain four or more characters. In this way, it may be possible to include e.g. 4 shorter suffices in the presented sub set, rather that just 2 or 3 longer ones. Alternatively, if no such favoring is applied, it may be necessary sometimes to reduce the number of suffices presented in the predetermined area, so that the permitted maximum part that overlaps the space bar is not exceeded. Another alternative would be to truncate the suffices, at least the longer ones, so that only the leading characters thereof are presented to represent the suffix in question.

A second aspect of the invention is an electronic apparatus having a user interface with a touch-sensitive display screen, and a controller coupled to said display screen, the user interface including a virtual keyboard which is presentable on said display screen so as to facilitate text input for a user by pointing at different virtual keys of said virtual keyboard, and the user interface including word completion functionality for predicting full word candidates for partial word inputs made by said user on said virtual keyboard, the controller being adapted for performing the steps of:

receiving a partial word input from said user;

deriving a set of full word candidates using said word completion functionality, each of the full word candidates in said set having a prefix and a suffix, wherein the prefix corresponds to said partial word input; and presenting the suffices for at least a sub set of the full word candidates in a predetermined area on said display screen, wherein each of the presented suffices is made selectable for said user.

The electronic apparatus may for instance be a mobile terminal for a mobile telecommunications system, such as GSM, UMTS, D-AMPS or CDMA2000, or a portable/personal digital assistant (PDA), a pocket computer, or another type of similar apparatus.

A third aspect of the invention is a computer program product directly loadable into a memory of a processor, where the computer program product comprises program code for performing the method according to the first aspect when executed by said processor.

The second and third aspects mat generally have the same features and advantages as the first aspect.

Other objectives, features and advantages of the present invention will appear from the following detailed disclosure, from the attached dependent claims as well as from the drawings.

BRIEF DESCRIPTION OF THE DRAWINGS

Embodiments of the present invention will now be described in more detail, reference being made to the enclosed drawings.

DETAILED DESCRIPTION OF THE INVENTION

Figure 1:
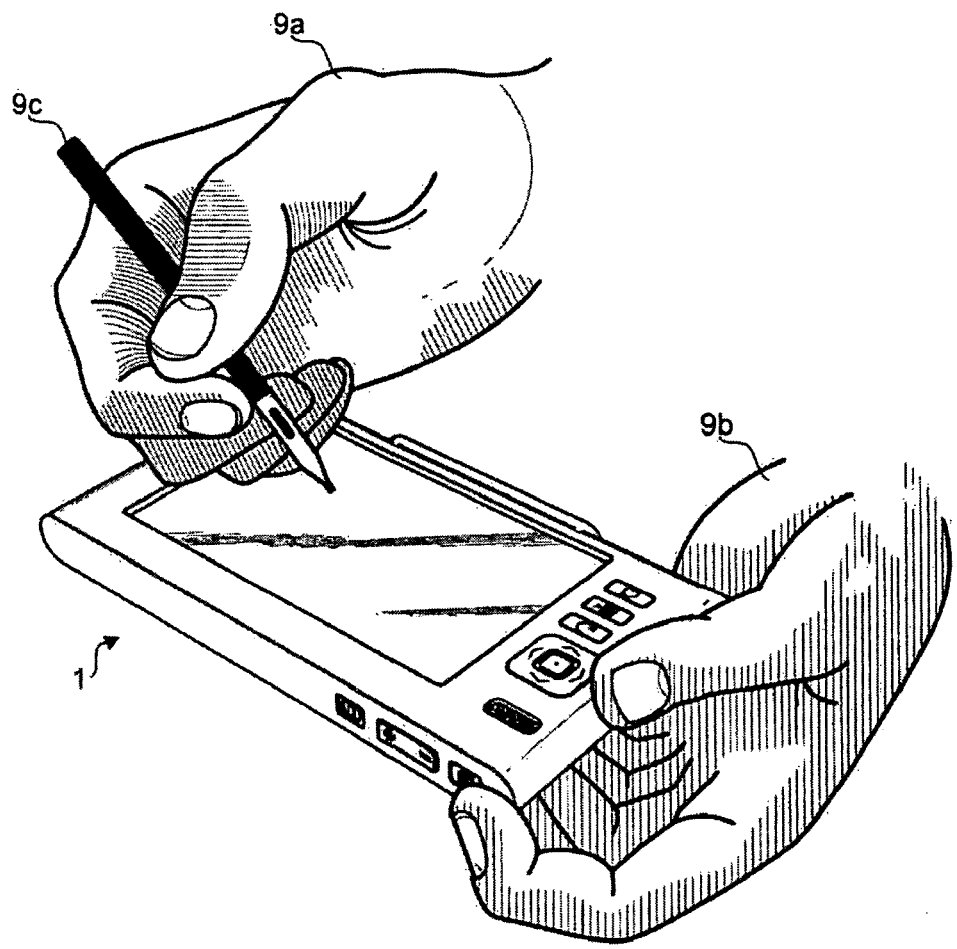
FIG. 1 is a perspective view of an electronic apparatus according to one embodiment, in the form of a pocket computer which is shown in a typical operating position in the hands of a user.

The pocket computer 1 of the illustrated embodiment comprises an apparatus housing 2 and a relatively large touch-sensitive display screen 3 provided at a front side $2_f$ of the apparatus housing 2. Next to the display screen 3 a plurality of hardware keys 5a-d are provided, as well as a speaker 6.

More particularly, key 5a is a five-way navigation key, i.e. a key which is depressible at four different peripheral positions to command navigation in respective orthogonal directions ("up", "down", "left", "right") among information shown on the display screen 3, as well as depressible at a center position to command selection among information shown on the display screen 3. Key 5b is a cancel key, key 5c is a menu or options key, and key 5d is a home key.

In addition, a second plurality of hardware keys 4a-c are provided at a first short side $2_u$ of the apparatus housing 2. Key 4a is a power on/off key, key 4b is an increase/decrease key, and key 4c is for toggling between full-screen and normal presentation on the display screen 3.

At a second short side $2_l$ of the apparatus housing 2, opposite to said first short side $2_u$, there are provided an earphone audio terminal 7a, a mains power terminal 7b and a wire-based data interface 7c in the form of a serial USB port.

Figure 5:
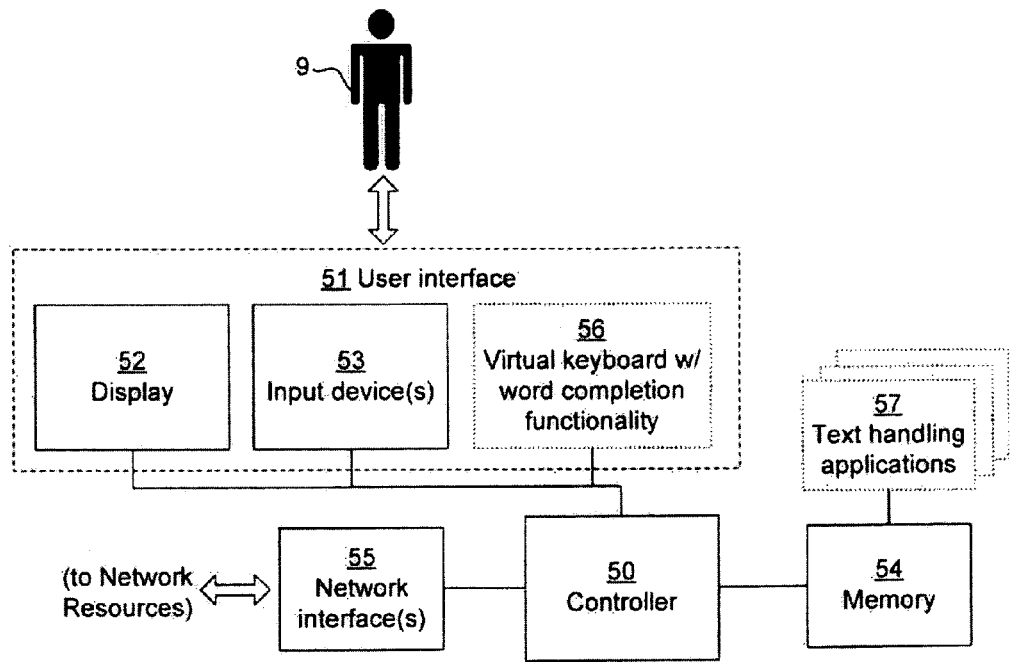
FIG. 5 is a schematic block diagram of the pocket computer according to the previous drawings.

Being touch-sensitive, the display screen 3 will act both as a visual output device 52 and as an input device 53, both of which are included in a user interface 51 to a user 9 (see FIG. 5). More specifically, as seen in FIG. 1, the user 9 may operate the pocket computer 1 by pointing/tapping/dragging with a writing tool 9c such as a stylus or pen, held in one hand 9a, on the surface of the touch-sensitive display screen 3 and/or by actuating any of the hardware keys 4a-c, 5a-d (which also are included as input devices in the user interface 51) with the thumb and index finger of the other hand 9b.

As seen in FIG. 5, the pocket computer 1 also has a controller 50 with associated memory 54. The controller is responsible for the overall operation of the pocket computer 1 and may be implemented by any commercially available CPU (Central Processing Unit), DSP (Digital Signal Processor) or any other electronic programmable logic device. The associated memory may be internal and/or external to the controller 50 and may be RAM memory, ROM memory, EEPROM memory, flash memory, hard disk, or any combination thereof. The memory 54 is used for various purposes by the controller 50, one of them being for storing data and program instructions for various pieces of software in the pocket computer 1. The software may include a real-time operating system, drivers e.g. for the user interface 51, as well as various applications.

At least some of these applications may be text handling applications 57, for instance in the form of a notes application (further shown in FIGS. 8, 11 and 12), a messaging application (e.g. SMS, MMS, email), a contacts application, a word processing application, etc. To facilitate text input, the user interface 51 includes a virtual keyboard module 56 with word completion functionality, having the general purpose which has already been explained above. In addition to this, the user interface may include other text input means.

To allow portable use, the pocket computer 1 has a rechargeable battery. The pocket computer also has at least one interface 55 for wireless access to network resources on at least one digital network. More detailed examples of this are given in FIG. 4. Here, the pocket computer 1 may connect to a data communications network 32 by establishing a wireless link via a network access point 30, such as a WLAN (Wireless Local Area Network) router. The data communications network 32 may be a wide area network (WAN), such as Internet or some part thereof, a local area network (LAN), etc. A plurality of network resources 40-44 may be connected to the data communications network 32 and are thus made available to the user 9 through the pocket computer 1. For instance, the network resources may include servers 40 with associated contents 42 such as www data, wap data, ftp data, email data, audio data, video data, etc. The network resources may also include other end-user devices 44, such as personal computers.

Figure 4:
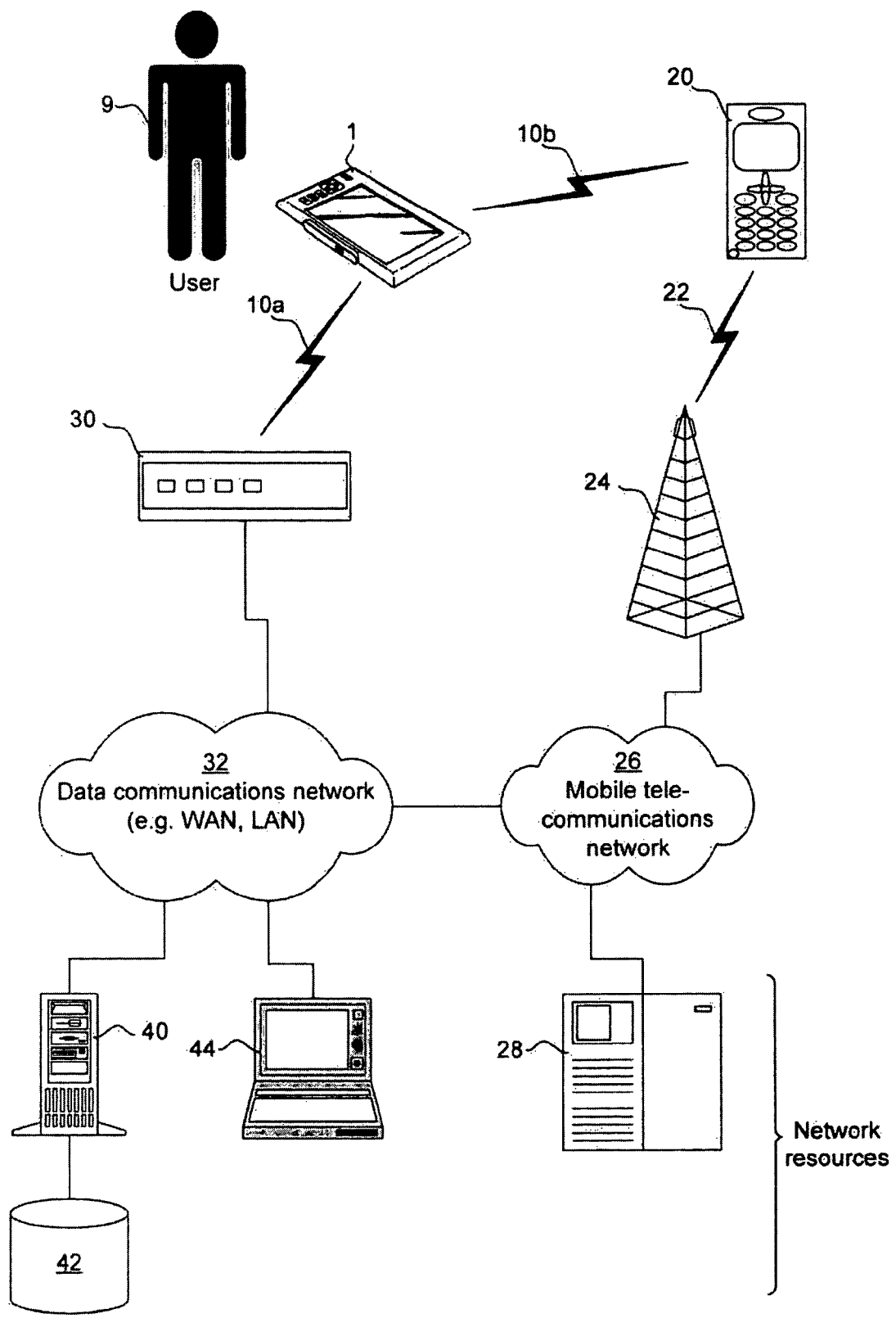
FIG. 4 illustrates a computer network environment in which the pocket computer of FIGS. 1-3 advantageously may be used for providing wireless access for the user to network resources and remote services.

A second digital network 26 is shown in FIG. 4 in the form of a mobile telecommunications network, compliant with any available mobile telecommunications standard such as GSM, UMTS, D-AMPS or CDMA2000. In the illustrated exemplifying embodiment, the user 9 may access network resources 28 on the mobile telecommunications network 26 through the pocket computer 1 by establishing a wireless link 10b to a mobile terminal 20, which in turn has operative access to the mobile telecommunications network 26 over a wireless link 22 to a base station 24, as is well known per se. The wireless links 10a, 10b may for instance be in compliance with Bluetooth™, WLAN (Wireless Local Area Network, e.g. as specified in IEEE 802.11), HomeRF or HIPERLAN. Thus, the interface(s) 55 will contain all the necessary hardware and software required for establishing such links, as is readily realized by a man skilled in the art.

Figure 2:
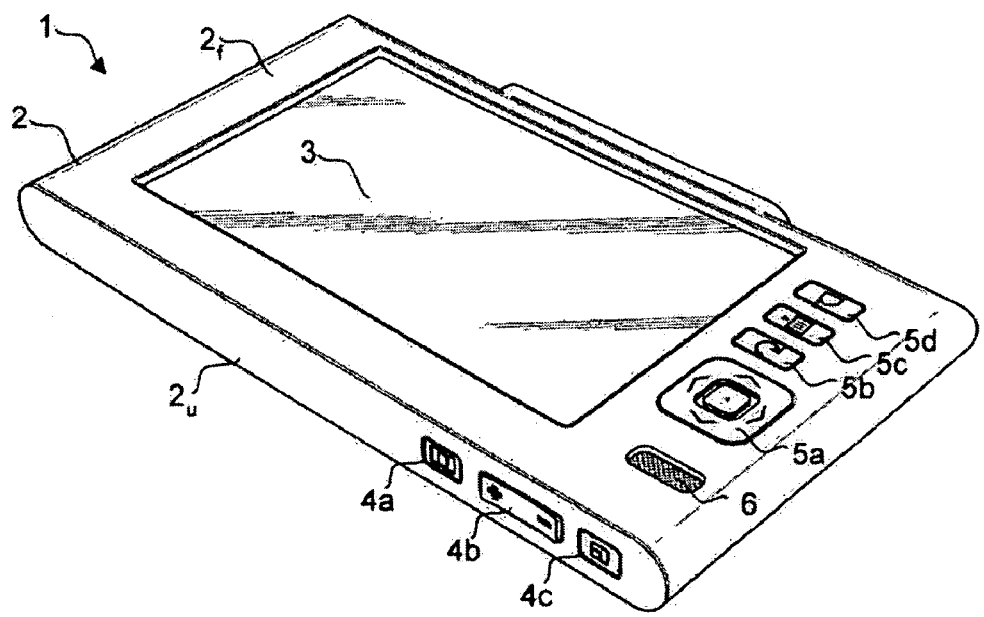
FIGS. 2 and 3 are different perspective views of the pocket computer of FIG. 1.
Figure 3:
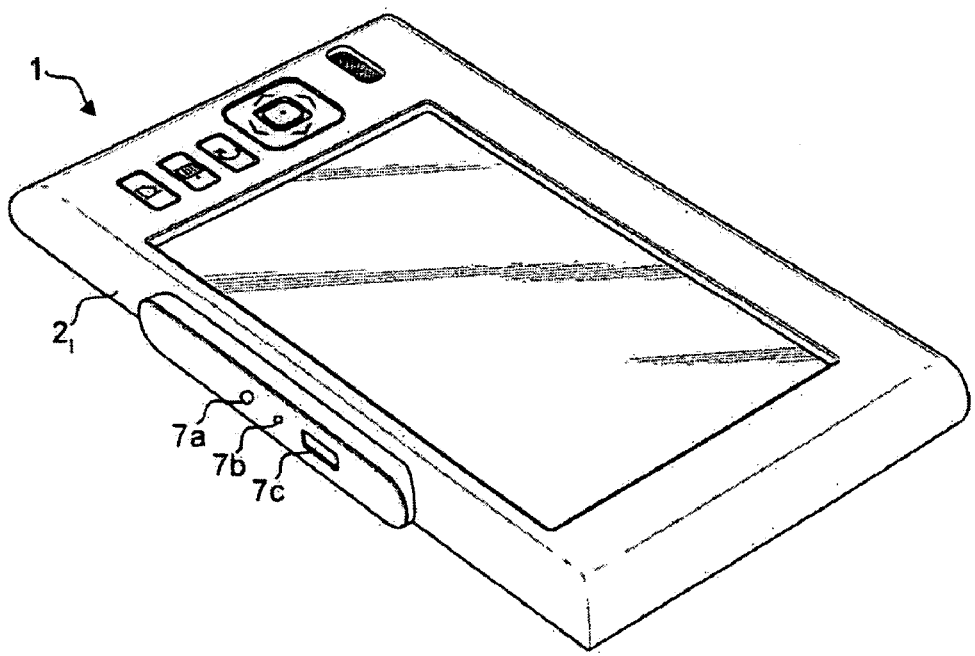
Figure 6:
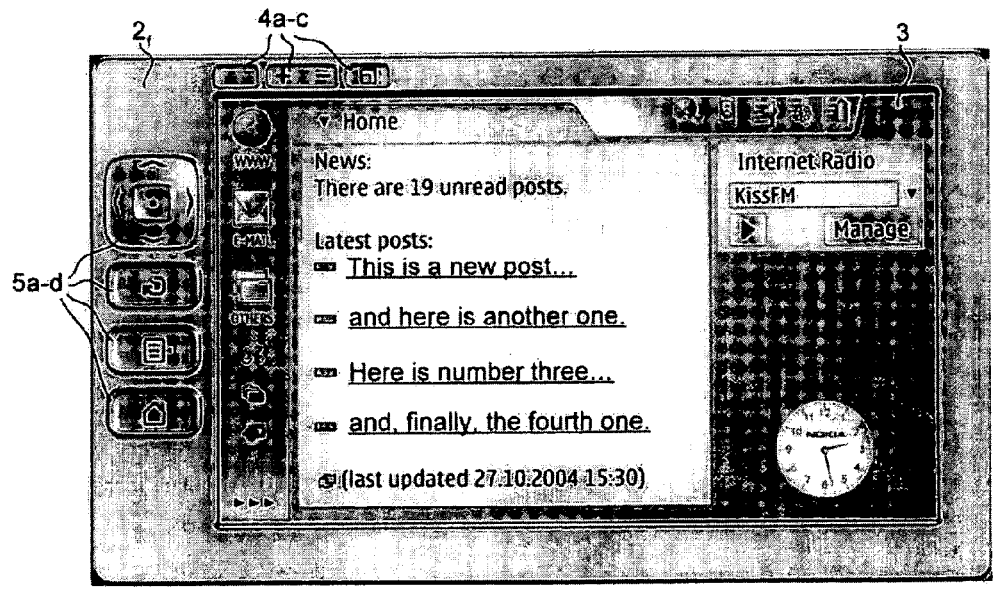
FIG. 6 is a front view of the pocket computer, demonstrating a typical display screen layout of its user interface.

FIG. 6 shows a front view of the pocket computer and indicates a typical display screen layout of its user interface. A typical disposition of the display screen layout, presenting a view of a home application (i.e., a start or base view that the user may return to whenever he likes), is shown in more detail in FIG. 7. In FIG. 6, the hardware keys 5a-d are shown at their actual location to the left of the display screen 3 on the front surface $2_f$ of the apparatus housing 2, whereas, for clarity reasons, the hardware keys 4a-c are illustrated as being located above the display screen 3 on the front surface $2_f$ even while they actually are located at aforesaid first short side $2_u$ (FIG. 2).

Figure 7:
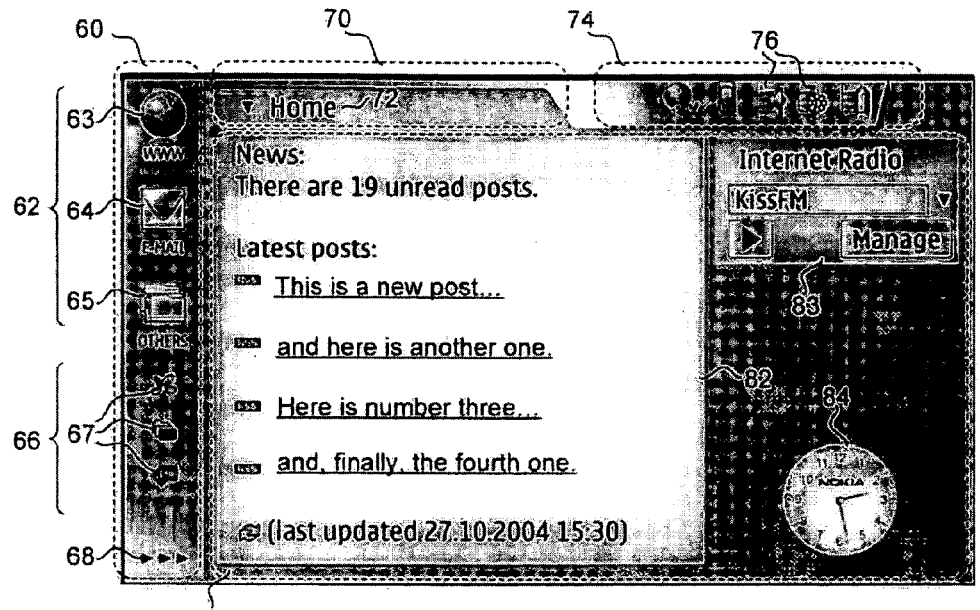
FIG. 7 illustrates a typical disposition of the display screen layout, including a home view.

With reference to FIG. 7, the layout of the display screen 3 is divided into four main areas: a task navigator 60, a title area 70, a status indicator area 74 and an application area 80.

Figure 8:
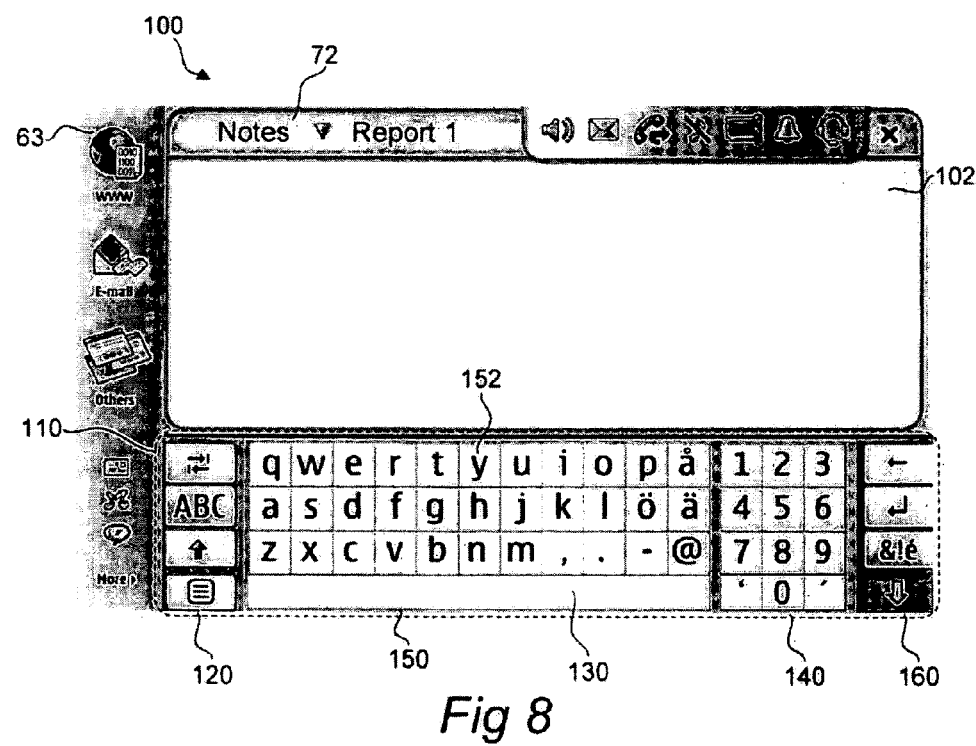
FIG. 8 illustrates a display screen layout for text input into a text handling application in the pocket computer.
Figure 9:
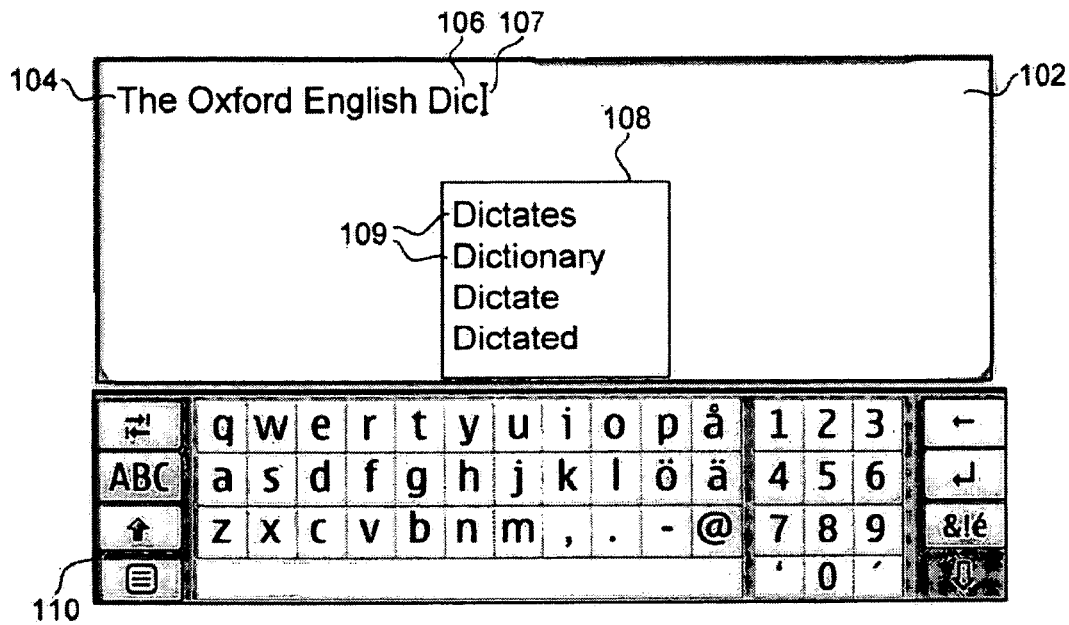
FIGS. 9 and 10 illustrate prior art approaches for word completion functionality.
Figure 10:
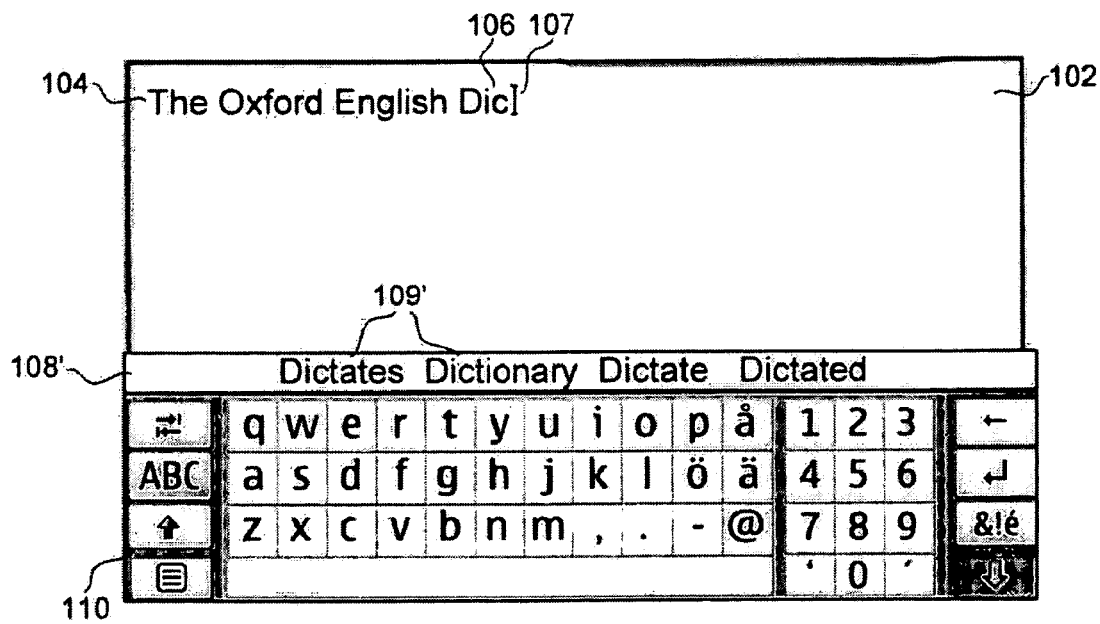

The application area 80 is used by a currently active application to present whatever information is relevant and also to provide user interface controls such as click buttons, scrollable list, check boxes, radio buttons, hyper links, etc, which allow the user to interact with the currently active application by way of the stylus 9c. One example of how a currently active application, in the form of a notes application, uses the application area 80 in this manner is shown in FIG. 8. A name or other brief description of the currently active application (e.g. the notes application) and a current file or data item (e.g. the currently open text file) is given at 72 in the title area 70 (e.g. "Notes—Report 1"). In addition, by tapping in the title area 70, the user may access a menu structure of the currently active application.

The status indicator area 74 contains a plurality of icons 76 that provide information about system events and status, typically not associated with any particular active application. As seen in FIG. 7, the icons 76 may include a battery charge indicator, a display brightness control, a volume control as well as icons that pertain to the network interface(s) 55 and the ways in which the pocket computer connects to the network(s) 32, 26.

The task navigator 60, title area 70 and status indicator area 74 always remain on screen at their respective locations, unless full screen mode is commanded by depressing the hardware key 4c. In such a case, the currently active application will use all of the display 3 and the areas 60, 70 and 80 will thus be hidden.

The task navigator 60 has an upper portion 62 and a lower portion 66. The upper portion 62 contains icons 63-65 which when selected will open a task-oriented, context-specific menu to the right of the selected icon. The context-specific menu will contain a plurality of task-oriented menu items, and the user may navigate among these menu items and select a desired one either by the navigation key 5a or by pointing at the display screen 3. As seen in FIG. 7, the lower portion 66 represents an application switcher panel with respective icons 67 for each of a plurality of launched applications.

Figure 11:
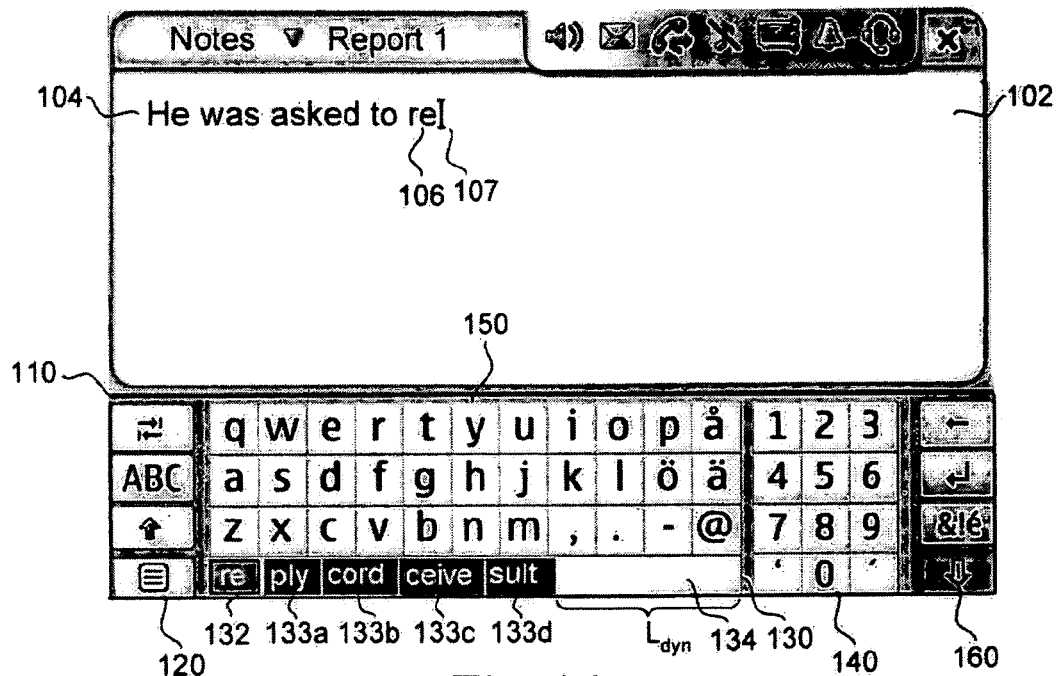
FIGS. 11 and 12 are display screen snapshots that illustrate the word completion functionality according to one embodiment.
Figure 12:
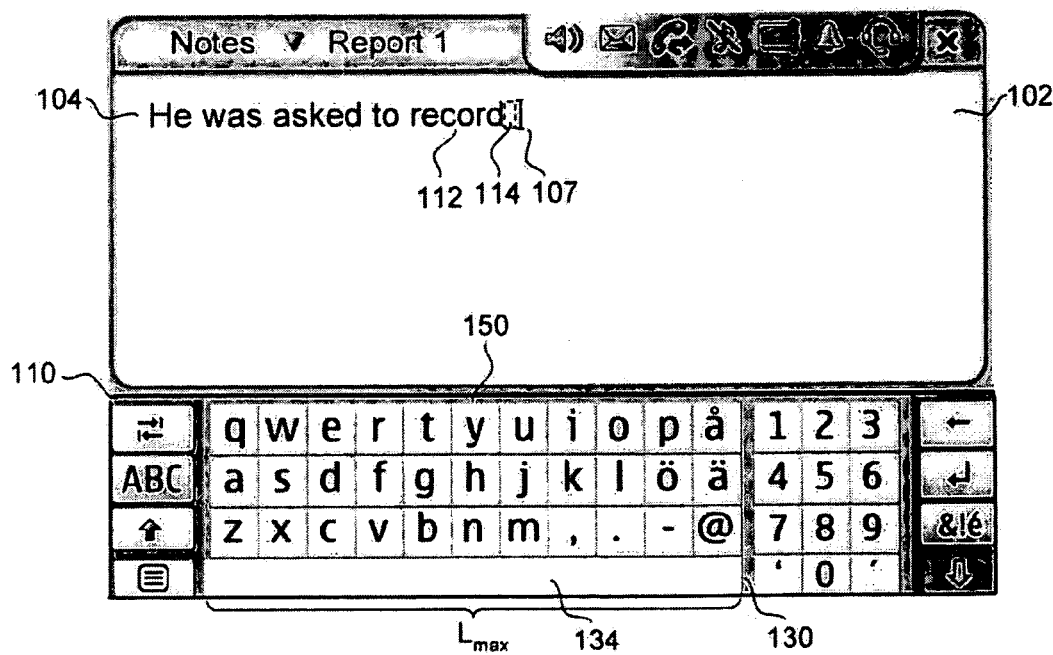

Referring now to FIGS. 8 and 11-12, the virtual keyboard module 56 with its word completion functionality will be described in more detail. As such, the word completion functionality may be implemented by any existing or future software package capable of deriving a set of full word candidates in response to a current partial word input 106 entered by the user by tapping on different keys of the virtual keyboard 110. To this end, the word completion functionality may use a dictionary stored in a database in memory 54, possibly together with statistics that reflect the frequency or likelihood of each word, or group of interrelated words, in the dictionary. The dictionary could be language-specific. The particulars of the word completion functionality as such are not a key aspect of the present invention, and no detailed description is given herein to avoid obscuring the invention in unnecessary detail. It is well within reach for the skilled practitioner to implement appropriate word completion functionality, either by designing one of his own or using a commercially available one.

In FIG. 8, a text handling application in the form of a notes application is active, as indicated at 72 in the title area 70, and has control of the application area 80 of the display screen layout 100. The application area is divided into a text input field 102 and a virtual keyboard 110. Currently, there is no text input shown in the text input field 102.

The virtual keyboard 110 is divided into four main groups of logical keys or buttons 120, 140, 150 and 160. Each such key has an activation area which is indicated as a grey box having a icon or symbol representing the meaning of the key in question. In a well known manner, by pointing with the stylus 9c within the activation area, the user 9 may select the key. Alternatively or in addition, text input may be performed by other input means.

If the selected key is an alphanumeric key included in a character key group 150 or numeric key group 140, such as a "y" key 152, the corresponding alphanumeric character will be directly displayed in the text input field 102, as is well known per se. If, on the other hand, the selected key belongs to a control key group 120 or 160, a corresponding function will instead be performed, such as backspace, carriage return, tabulation, switch of character set, caps lock, etc.

In FIG. 11, the user has made a text input 104 which includes four complete words ("He", "was", "asked", "to") and one partial word input 106 ("re"). Now, the word completion functionality is called upon to derive a set of full word candidates for the partial word input. In the illustrated example in FIG. 11, the derived set of full word candidates includes the candidates "reply", "record", "receive" and "result". Contrary to the prior art, these candidates are not shown in their entirety on the display screen. Instead, the prefix 132 that corresponds to the partial word input 106 is presented together with the suffixes 133a-133d of the above-mentioned full word candidates in a predetermined area arranged on top of a space bar 130 in the character key group 150. A certain part of the activation area 134 of the space bar 130 is still left available for the user to tap with the stylus for manual selection of a space character. Thus, only a fraction ($L_{max}$-$L_{dyn}$) of the nominal length $L_{max}$ of the space bar 130 (see FIG. 12) is used for presentation of candidate suffices 133a-133d.

The user 9 may now conveniently select the desired full word candidate by pointing at its suffix with the stylus. Thus, if the user selects the suffix 133b ("cord"), the associated full word candidate 112 (made up of prefix "re" and suffix "cord") will automatically replace the partial word 106 at the cursor 107 in the text input field 102, as is seen in FIG. 12. Alternatively, the suffix 133b may be appended to the partial word input 106 in the text input field to form the full word 112; the end effect will be the same: automatic completion of a partial word input into a desired and selected full word 112. Once this has taken place, the prefix 132 and the full word candidates 133a-d will be removed from presentation on top of the space bar 130, thereby again revealing all of the activation area 134 of the latter. When the text input field 102 is updated in this manner with a selected full word candidate, a trailing space character 114 may be appended automatically at the end of the full word 112.

In one embodiment, as has already been explained, the user may himself control whether or not such a trailing space character is to be added by choosing between selecting the candidate with a tapping action (stylus-down followed by stylus-up within the activation area of the candidate) or with a dragging action (stylus-down within the activation area, followed by stylus-dragging outside of the activation area and then stylus-up).

Note that the user is not obliged to select any of the presented full word candidates; if he is not happy with any of them he may keep on tapping on the various keys of the virtual keyboard 110 to keep on inputting text character by character. Each time an additional character has been added to a partial word, the word completion functionality will use this extended partial word and derive new full word candidates for presentation on top of the space bar 130. When the user has completed a word manually by tapping on different keys, he may select the space bar 130, wherein a space character will be added after the last word input and any presented full word candidates will be removed from the space bar 130.

In one embodiment the word completion functionality may be adapted to derive all possible full word candidates using said dictionary. In such a case, it is likely that the predetermined area on the space bar 130 will not be able to present the suffices for all such possible candidates at the same time. Optionally, the suffices of the most likely candidates, as judged from aforesaid statistics, or of the first candidates in some structured order such as alphabetic, may be shown initially in the predetermined area, and the suffices of the other candidates may be made accessible by tapping a "more" element in the user interface. Upon selection of this element, a pop-up menu with more candidates may be launched somewhere on the display screen.

In one embodiment, as already explained, single-character candidates are not presented, since there will be no real saving in the amount of key taps for such candidates.

In one embodiment, the minimum length $L_{dyn}$ of the part of the space bar's activation area 134 that is left uncovered by full word candidates 133*a-d* corresponds to at least the length of two characters, and a maximum of four candidate suffices are shown at the same time in the predetermined area. Four suffices are believed to be efficient for the user to quickly browse and select among. In cases where the predetermined area would not fit four candidates, e.g. because of long suffices, the number of presented candidate suffices may either be reduced to three (or less), or candidates may be switched so that shorter candidate suffices will be presented instead of longer ones. Still one alternative would be to truncate candidate suffices (e.g. present only "mplet . . . " instead of "mpletion").

The invention has mainly been described above with reference to a number of embodiments. However, as is readily appreciated by a person skilled in the art, other embodiments than the ones disclosed above are equally possible within the scope of the invention, as defined by the appended patent claims. One alternative aspect of the invention involves presenting a set of full word candidates in their entirety in the predetermined area on top of the space bar. Thus, even if such an alternative aspect will not make the benefits of using candidate suffices only, it will still have all the benefits associated with presenting word completion candidates on top of the space bar, as compared to the locations where such candidates have been presented in the prior art.

The invention claimed is:

1. A text input method for an electronic apparatus having a user interface with a touch-sensitive display screen, wherein a virtual keyboard is presentable on said display screen so as to facilitate text input for a user by pointing at different virtual keys of said virtual keyboard, and wherein word completion functionality is provided for predicting full word candidates for partial word inputs made by said user on said virtual keyboard, the method comprising: receiving a partial word input from said user; deriving a set of full word candidates using said word completion functionality, each of the full word candidates in said set having a prefix and a suffix, wherein the prefix corresponds to said partial word input; and presenting the suffixes for at least a sub set of the full word candidates in a predetermined area on said display screen, wherein the predetermined area is located within or at the virtual keyboard on the display screen and the predetermined area is located within, or on top of, a space bar included in the virtual keyboard wherein each of the presented suffixes is made selectable for said user;

detecting selection by said user of one of the presented suffixes; and for the selected suffix, replacing a presentation of said partial word on said display screen with a presentation of the full word candidate to which the suffix belongs;

wherein said step of detecting selection by said user involves differentiating between a first type of selection and a second type of selection, and wherein said step of replacing a presentation involves adding a space character after said full word candidate if the detected selection is of said first type.

2. A text input method as defined in claim 1, wherein said first type of selection involves tapping with a writing tool within an activation area representing said selected suffix, and wherein said second type of selection involves pointing with the writing tool within said activation area and dragging the writing tool outside of said activation area before lifting it.

3. A text input method as defined in claim 1, wherein said second type of selection involves tapping with a writing tool within an activation area representing said selected suffix, and wherein said first type of selection involves pointing with the writing tool within said activation area and dragging the writing tool outside of said activation area before lifting it.

\* \* \* \* \*